US005116583A

United States Patent [19]

Batchelder et al.

[11] Patent Number: 5,116,583

[45] Date of Patent: May 26, 1992

[54] SUPPRESSION OF PARTICLE GENERATION IN A MODIFIED CLEAN ROOM CORONA AIR IONIZER

[75] Inventors: John S. Batchelder, Tarrytown, N.Y.; Vaughn P. Gross, St. Albans, Vt.; Philip C. D. Hobbs, Ossining; Robert J. Miller, Yorktown Heights, both of N.Y.; Kenneth D. Murray, Huntington, Vt.

[73] Assignee: International Business Machines Corporation, Armonk, N.Y.

[21] Appl. No.: 696,308

[22] Filed: Apr. 29, 1991

Related U.S. Application Data

[63] Continuation of Ser. No. 499,880, Mar. 27, 1990, abandoned.

[51] Int. Cl.[5] ...................... B01J 19/08; H01T 23/00; H05F 3/00

[52] U.S. Cl. ............................... 422/186.07; 361/231; 361/230; 250/324

[58] Field of Search ...................... 422/186.09, 186.07, 422/907; 204/175, 176; 250/324; 361/226, 230, 231

[56] References Cited

U.S. PATENT DOCUMENTS 4,424,549 1/1984 Ensing ................................ 361/230
4,665,462 5/1987 Blitshteyn et al. .................. 361/235

FOREIGN PATENT DOCUMENTS 2202625 3/1974 France .

OTHER PUBLICATIONS

K. Dillenbeck, "Selection of Air Ionization Within the Cleanroom", Proc. 32nd Annual Tech Mtg of the IES, pp. 387-392.

R. P. Donovan et al., "The Dependence of Particle Deposition Velocity on Surface Potential" 1987 Proc. of the IES, pp. 473-478.

B. Y. H. Liu et al., "Aerosol Charging and Neutralization and Electrostatic Discharge in Clean Rooms" J. Envir. Sci. Mar./Apr. 1987, pp. 42-46.

M. Suzuki et al., "Effectiveness of Air Ionization Systems in Clean Rooms" Proc. 34th Annual Tech. Mtg. of the IES (1988) pp. 405-412.

K. Murray et al., "Ozone and Small Particle Production by Steady State DC Hood Ionization: An Evaluation" 1989 EOS/ESD Symposium Proc. pp. 18-22.

K. D. Murray et al., "Hood Ionization in Semiconductor Wafer Processing: An Evaluation" 1988 EOS/ESD Symposium Proc. pp. 195-200.

*Primary Examiner*—J. Woodrow Eldred
*Attorney, Agent, or Firm*—Philip J. Feig

[57] ABSTRACT

A clean non-hydrogen-containing dry gas flows through the corona points of a clean room corona air ionizer in order to suppress the generation of particles.

4 Claims, 1 Drawing Sheet

SUPPRESSION OF PARTICLE GENERATION IN A MODIFIED CLEAN ROOM CORONA AIR IONIZER

This application is a continuation of application Ser. No. 07/499,880 filed Mar. 27, 1990, abandoned.

BACKGROUND OF THE INVENTION

The present invention relates to an improved corona air ionizer which eliminates microcontamination associated with conventional corona ionizers. Specifically, the invention provides for the elimination of ammonium nitrate buildup on the negative corona points and the elimination of bursts of submicron particles in corona ionizers by providing a stream of non-hydrogen-containing dry gas at the corona point during operation. Corona ionizers are commonly used in clean rooms, particularly clean rooms used in the manufacture of semiconductor devices.

Corona air ionizers have historically had a reputation for generating particulate contamination, while being very effective at reducing electrostatic charges on surfaces. Controlling electrostatic discharge (ESD) and reducing the sedimentation rate of small submicron aerosol particles are described in the article by K. Dillenbeck entitled "Selection of Air Ionization Within the Cleanroom" in Proceedings of the 32nd Annual Technical Meeting of the IES, pp 387–392 and in the article by R. P. Donovan et al entitled "The Dependence of Particle Deposition Velocity on Surface Potential" in 1987 Proceedings of the IES, pp 473–478. Unfortunately, corona air ionizers usually generate large quantities of small (less than 0.1 $\mu$m) particles, primarily metal sputtered from the corona points themselves as noted in the article by B. Y. H. Liu et al entitled "Aerosol Charging and Neutralization and Electrostatic Discharge in Clean Rooms," in J. Envir. Sci, March/April 1987, pp 42–46 and in the article by M. Suzuki et al entitled "Effectiveness of Air Ionization Systems in Clean Rooms" in Proceedings of the 34th Annual Technical Meeting of the IES, pp 405–412.

Recently, an article by K. D. Murray et al entitled "Ozone and Small Particles Production by Steady State DC Hood Ionization: An Evaluation" in 1989 EOS-/ESD Symposium Proceedings, pp. 18–22 and an article by K. D. Murray et al entitled "Hood Ionization in Semiconductor Wafer Processing: An Evaluation" in 1988 EOS/ESD Symposium Proceedings, pp 195–200, have shown that proper point design and material selection, in particular the use of plain tungsten corona points instead of thoriated tungsten corona points and careful control of the tip shape, can reduce the sputtered metal to insignificant levels, and have suggested that the major remaining source of contamination is ammonium nitrate ($NH_4NO_3$) precipitated onto the negative corona points from the ambient air. Dispersive x-ray analysis ruled out tungsten as a major contributor to the remaining particles. Chemical analysis of the white precipitate on the negative points further showed it to be mostly $NH_4NO_3$, making it plausible that the particles are also $NH_4NO_3$. In addition to generating contamination, the precipitation necessitates replacing the points every month which contributes significantly to the cost of maintaining corona ionizers.

Experience has shown that the quantity of particles present often vary from none to tens of thousands of particles per cubic foot in a short time period. The highly intermittent character makes the emission episodes difficult to analyze. The problem is compounded of the lack of control over several relevant variables, such as humidity and temperature.

SUMMARY OF THE INVENTION

Particulates generated in clean rooms are mostly charged. If electric fields are present arising from charged surfaces, a strong attraction is created between the particles and the corresponding apparatus charged surfaces. The described phenomena is the primary cause for the anomalously large deposition rates seen in manufacturing at small particle sizes. In addition, triboelectric charging of semiconductor wafers, wafer boats, equipment, people and work surfaces result in electrostatic discharge events which can damage the wafers both electrically, by breaking down insulating layers and fusing conductors, and through the ablation of small particles from the surfaces involved in the discharge.

A technique that has been employed to reduce these electrostatic affects is to neutralize the surfaces of the products and tools on a manufacturing line by adding air ions of both positive and negative polarities to the output of laminar flow HEPA filters, thereby rendering the air sufficiently conductive to neutralize the surface charges. For example, typical electric fields produced by ungrounded wafers or containers are a few hundred to a few thousand volts per centimeter. The deposition rates for particles out of class 100 air is roughly 100 times lower for environments that incorporate air ionization than for those without air ionization as noted in the article by R. Welker entitled "Equivalence Between Surface Contamination Rates and Class 100 Conditions", 1988 Proceedings, IES, pp 449–454. The effect is attributed to the neutralization effect of the injected charge in the air on the excess surface charges.

Ammonium nitrate is a compound of nitrogen, hydrogen and oxygen. It is a high-energy compound and can ordinarily be formed only in a high energy density environment such as a high temperature gas reactor, lightning discharge, or in the present case, corona discharge. If the particles are ammonium nitrate, then the formation of particles requires a source of hydrogen. The most plausible source of hydrogen is atmospheric water vapor. It follows that if the corona discharge is made to occur in a sufficiently dry gas environment, no ammonium nitrate will be generated.

In the present invention, the corona points of a conventional corona ionizer are disposed in a stream of non-hydrogen-containing dry gas which will not corrode the corona points and will not form water vapor, for instance by placing the corona points inside a closed end tube with a clean non-hydrogen-containing dry gas, such as dry air, oxygen, carbon dioxide, nitrogen, argon or helium, flowing through the corona points.

A principal object of the present invention is therefore, the provision of an apparatus for suppressing particle generation in a corona air ionizer.

Another object of the invention is the provision of eliminating ammonium nitrate particles usually created in corona ionizers by the use of a stream of non-hydrogen-containing dry gas.

Further objects of the present invention will become more clearly apparent when the following description is read in conjunction with the accompanying drawings.

DETAILED DESCRIPTION

Figure 1:
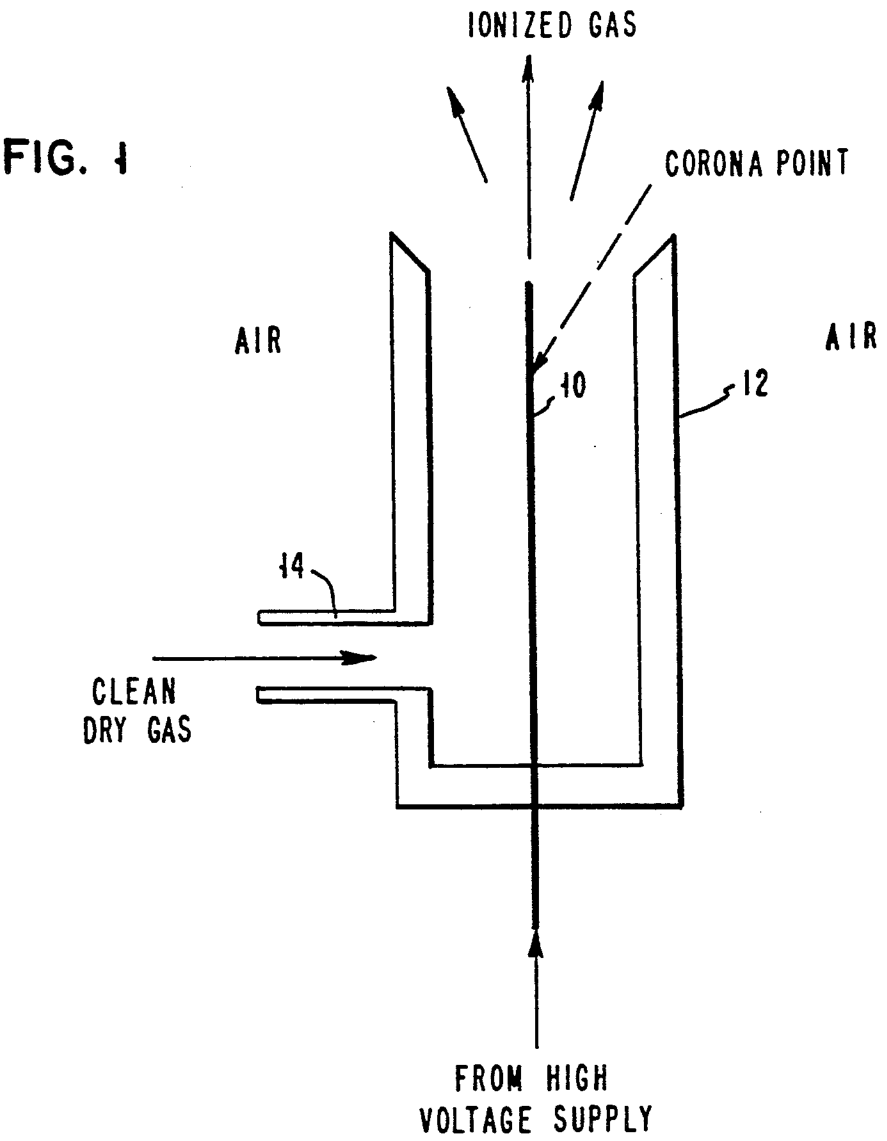
FIG. 1 is a schematic representation, in section, of the corona points of corona ionizers in accordance with the present invention.

Referring now to the figures and to FIG. 1 in particular corona point 10 of a conventional ionizer is disposed inside a closed-end tube 12. The corona point is connected to a high voltage power source for generating ions by corona discharge. Clean non-hydrogen-containing dry gas which will not corrode the corona points and will not form water vapor, preferably dry air, oxygen, carbon dioxide, nitrogen, argon or helium, enters from conduit 14 into tube 12. The open end of the tube is positioned in front (above in the figure) of the corona point so that the ions generated by the discharge are carried out through the opening with the stream of non-hydrogen-containing dry gas. Oxygen and water vapor from the surrounding ambient air are prevented from approaching the corona points by the outwardly flowing gas. The outflowing ions mix with the ambient air, providing an ionization essentially indistinguishable from the unmodified ionizer operating in the ambient air.

Figure 2:
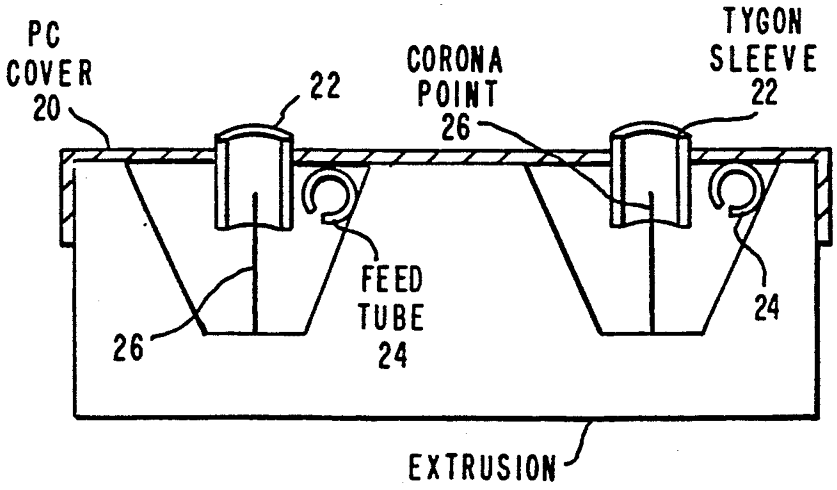
FIG. 2 is a cross-section view of a modified end of a corona ionizer.

In a preferred embodiment of the invention, a bipolar DC corona ionizer, Semtronics, Inc. Model 2001, was modified. The ionizer consists of a 2 m long plastic extrusion (formed by joining two 1 m lengths together end to end) whose cross-section is shaped in the form of the Greek letter capital sigma "Σ", with the positive points spaced at 30 cm intervals along the middle of the upper groove and the negative points are similarly positioned in the other groove in a staggered relation so that each positive point is 15 cm from the closest negative point. In operation, the bar hangs horizontally, with the grooves facing sideways. During testing, in order to provide a control, the left-hand piece of the ionizer was left unmodified and the right-hand piece was modified as shown in FIG. 2. In operation, the entire ionizer will be modified as described below.

Both right-side extruded channels are covered, for example with PVC tape 20. A hole of approximately 1 cm diameter is cut in front of each corona point. A sleeve 22, preferably one cm long, and made from 0.5 inch OD Tygon tubing, is inserted into the hole to prevent moist air from being entrained into the region of the corona point by turbulence. The region below the tape 20 is continuously flushed with a clean non-hydrogen-containing dry gas which will not corrode the corona point and will not form water vapor, such as dry air, oxygen, carbon dioxide, nitrogen, argon or helium, via a perforated tube 24, made for example of Teflon, with a high-efficiency in-line filter (not shown). The corona points are manufactured of pure tungsten. The corona points are connected to a high voltage power source (not shown) for generating ions by corona discharge.

The sleeves 22 must be kept away from the discharge region to avoid creating particles arising from erosion of the sleeves. The sleeves are preferably more than 4 mm from the tips of the corona points 26.

The bar was hung 60 cm from a clean room wall, in unobstructed 90 cm/s vertical air flow about 20 cm below ceiling HEPA filters.

Results showed that while the control air-immersed corona points had the characteristic white $NH_4NO_3$ deposits, there was no visible contamination of the dry gas immersed point.

After eliminating sputtered metal particles by proper corona point design, the residual particle generation from a commercially available DC air ionizer is highly dependent on humidity in the immediate vicinity of the corona discharge. A modification to the ionizer design to exclude water vapor and other hydrogen sources essentially eliminated a major source of contamination.

With the water vapor excluded, there is no hydrogen source from which to make ammonia, and so the particle generation ceases.

The elimination of all hydrogen sources from the vicinity of the corona point prevents the formation of ammonia thereby suppressing particle generation.

An important aspect of the invention is that much pre-existing air ionization equipment is capable of being upgraded for use in clean rooms producing semiconductor devices with submicron features; where the use of such an ionizer has previously been precluded by the particles generated. The modification is simple, inexpensive and does not require any change in the operation of the system.

While there has been described and illustrated a preferred embodiment of the present invention, it will be apparent to those skilled in the art that modifications and variations are possible without deviating from the broad scope of the present invention which shall be limited solely by the scope of the claims appended hereto.

What is claimed is:

1. A corona air ionizer comprising:
   - a housing;
   - a corona point disposed in said housing;
   - feed means coupled to said housing for causing a stream of non-hydrogen-containing dry gas without ambient air to flow past said corona point;
   - cover means containing a plurality of perforations coupled to said housing and disposed in proximity to said corona point and said feed means; and
   - sleeve means extending through said perforations for channeling ions generated by corona discharge through said sleeve means out of said housing away from said corona point.

2. A corona air ionizer as set forth in claim 1, wherein said dry gas is selected from the group consisting of dry air, oxygen, carbon dioxide, nitrogen, argon and helium.

3. A corona air ionizer including corona points wherein the improvement comprises:
   - cover means containing a plurality of perforations disposed in proximity to said corona points;
   - tube means disposed in proximity to said corona points for providing a stream of non-hydrogen-containing dry gas without ambient air past said corona points; and
   - sleeve means extending through said perforations for channeling ions generated by corona discharge through said sleeve means.

4. A corona air ionizer as set forth in claim 3, wherein said dry gas is selected from the group consisting of dry air, oxygen, carbon dioxide, nitrogen, argon and helium.

* * * * *